W. W. SMITH.

Propagating Plants.

No. 61,479.

Patented Jan. 22, 1867.

Witnesses:
Theo. Tusch
J. A. Service

Inventor:
William W. Smith
Per Munn & Co.
Attorneys

United States Patent Office.

WILLIAM W. SMITH, OF MONTROSE, PENNSYLVANIA.

Letters Patent No. 61,479, dated January 22, 1867.

---

IMPROVEMENT IN TRANSPLANTING TRAY.

---

*The Schedule referred to in these Letters Patent and making part of the same.*

---

TO ALL WHOM IT MAY CONCERN:

Be it known that I, WILLIAM W. SMITH, of Montrose, in the county of Susquehanna, and State of Pennsylvania, have invented a new and useful Improvement in Plant Trays; and I do hereby declare that the following is a full, clear, and exact description thereof, reference being had to the accompanying drawings, forming part of this specification.

My invention consists in forming a box or tray for the propagation or growth and cultivation of plants and flowers, either for out-door or in-door use, whereby a variety of plants or flowers may be cultivated in separate compartments and each in the peculiar soil which is adapted to its growth; and furthermore, in providing for the removal of any one plant, with the earth attached, without disturbing the roots or interfering with the surrounding plants.

To enable others skilled in the art to make and use my invention, I will proceed to describe its construction and operation.

Similar letters of reference indicate like parts.

Figure 1:
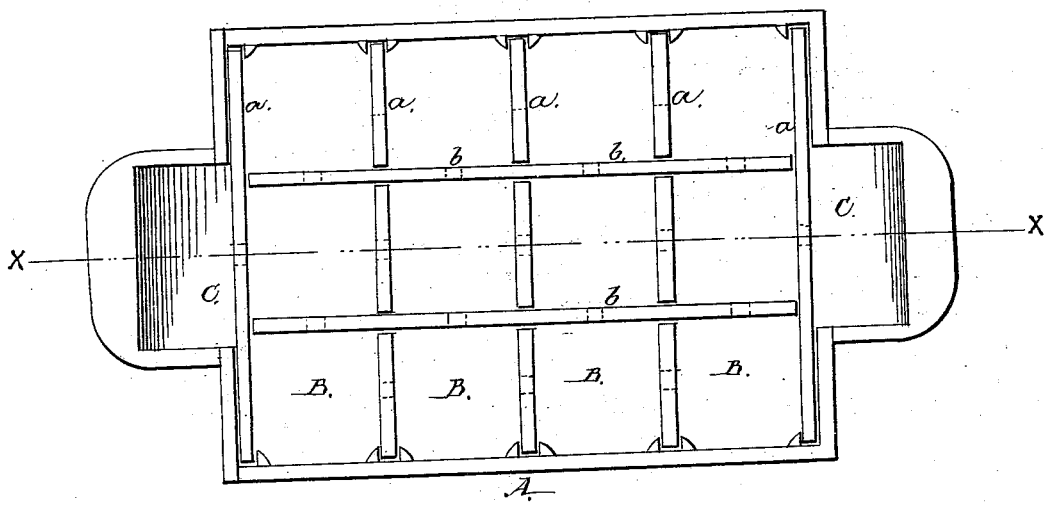
Figure 1 represents a plan or top view of my plant tray.
Figure 2:
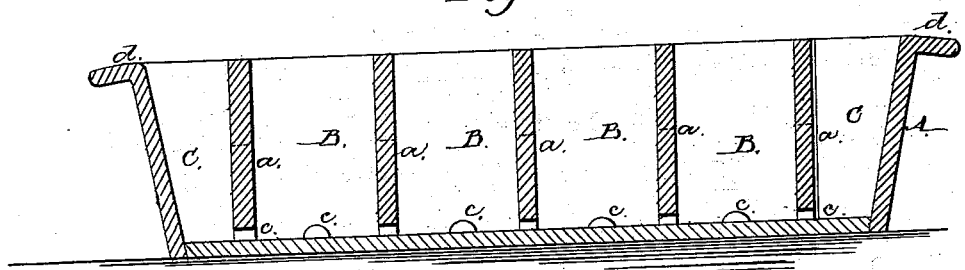
Figure 2 is a vertical section through the line $x$ $x$ of fig. 1.

The tray is made of any desired size and divided into compartments, as seen in the drawing, fig. 1. A represents the outside of the tray; B the compartments; C are projections on opposite sides, which form ears by which the tray is handled. The compartments are formed by boards or suitable lumber, locked together and placed edgewise, as seen in the drawing. On two sides of the tray there are cleats, fastened to the inside of the tray, to keep the partitions in place, the cleats forming a groove for that purpose. The partitions secured in this way are marked $a$ in the drawing. These pieces are dropped into the grooves loosely and are easily removed. The cross partitions, marked $b$, are locked or halved on to the pieces $a$, $a$ being cut out to receive them. These cross partitions are also dropped loosely into their places, so that they can be easily removed. On the under edge of all these partitions there are notches cut, as indicated in fig. 2, and marked $c$. This is for the purpose of allowing the water to be uniformly distributed on the bottom of the tray, as these passages give free communication for the water between the different compartments. When it is desired to remove a plant, take out one or more of the cross partitions, when the plant can be removed with ease, without disturbing its roots or the roots of the plants around it. The projection C extends to the bottom of the tray for the purpose of allowing the quantity of water on the bottom of the tray to be seen, the bottom in the projections being left bare for the purpose. There are ears on this projection, marked $d$, which allow the tray to be easily lifted or handled. If more space is desired for any particular plants, one or more of the partitions can be removed. This tray is very convenient for those having no hot bed for the propagation of early plants, and also for small house plants, as many may be allowed to grow and blossom together, forming a beautiful ornament for the house at all seasons of the year.

Having thus described my invention, what I claim as new, and desire to secure by Letters Patent, is—

A plant tray, constructed substantially as described, for the propagation and growth of plants and flowers, as herein set forth.

WILLIAM W. SMITH.

Witnesses:
    A. D. WARREN,
    C. A. WORRER.